Feb. 10, 1925.
J. H. SHAW
REVERSIBLE LID FOR FRUIT BOXES
Filed Dec. 24, 1923
1,525,663
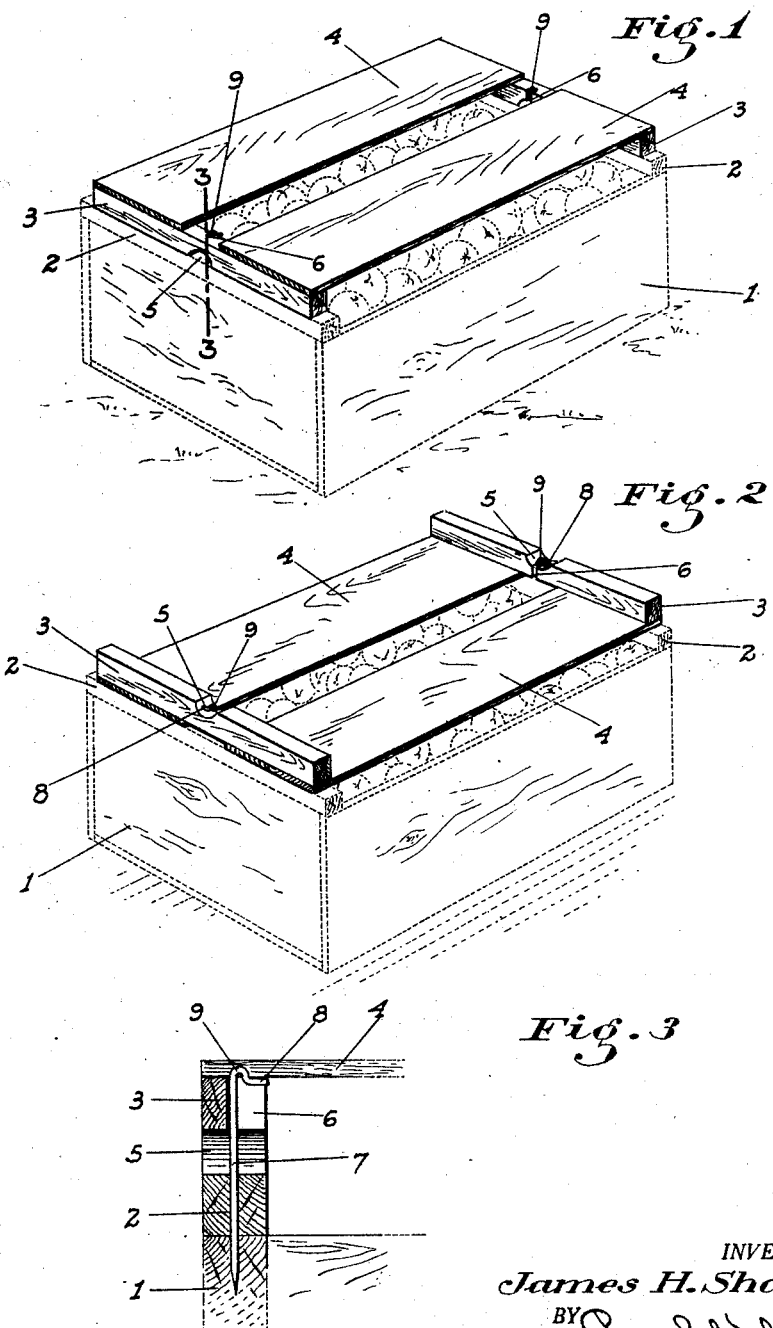
INVENTOR.
James H. Shaw
BY
ATTORNEY Patented Feb. 10, 1925.

1,525,663

UNITED STATES PATENT OFFICE.

JAMES H. SHAW, OF OAKLEY, CALIFORNIA.

REVERSIBLE LID FOR FRUIT BOXES.

Application filed December 24, 1923. Serial No. 682,384.

*To all whom it may concern:*

Be it known that I, JAMES H. SHAW, a citizen of the United States, residing at Oakley, county of Contra Costa, State of California, have invented certain new and useful Improvements in Reversible Lids for Fruit Boxes; and I do declare the following to be a full, clear, and exact description of the same, reference being had to the accompanying drawings, and to the characters of reference marked thereon, which form a part of this application.

This invention relates to improvements in lid construction for the boxes in which fruit, particularly grapes and the like, is packed in the vineyard or field, and subsequently shipped.

When packing and shipping grapes, the boxes are inspected before being placed on the cars or other transporting means, and therefore lids cannot be permanently placed on the boxes until after the inspection.

Also, the fruit is usually placed in the boxes in the field to a level higher than the top of the box, since it invariably happens that with the jolting and jarring to which the boxes are subjected, and which is incident to their handling between the time the fruit is picked and when the boxes are loaded on the cars, the fruit settles considerably.

Lids therefore are ordinarily left off the boxes until they are about to be loaded and the settling has taken place, and after the above named inspection has been carried out.

The boxes, being usually stacked in vertical tiers, the protruding fruit therein is mashed down and forced to occupy a more limited space in an unnatural manner, to the detriment of the fruit.

The principal object of my invention therefore is to provide a lid which may be mounted on the box as soon as the fruit is picked and which will prevent the undue pressing down of the same by a superimposed box, and which lid, by reversing the same, will set on the box at a lower level than that previously had, and will then enclose and protect the fruit after the normal settling thereof has taken place.

Another object of my invention is to provide a fastening and locating means for the lid, so arranged that the latter, when placed on the box in the field, is held from horizontal displacement but may be instantly removed for inspection of the fruit.

When the lid is then reversed and mounted in its final position, the fastening means may then be easily manipulated to hold the lid not only against horizontal, but against vertical displacement and removal as well.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views:

Figs. 1 and 2 are perspective views of an ordinary fruit box, showing my improved lid as applied thereto in the field and shipping positions, respectively.

Fig. 3 is an enlarged fragmentary section on the line 3—3 of Fig. 1.

Referring now more particularly to the characters of reference on the drawings, the numeral 1 denotes a fruit-packing box of ordinary design, having transverse end-cleats 2 projecting upwardly from the box.

My improved lid comprises cleats 3 adapted to aline with the cleats 2 but somewhat shorter than the same, on one of the horizontally disposed faces of which cleats 3 are permanently secured the boards or slats 4 forming the lid proper, these slats being spaced apart centrally of the length of the cleats 3, as shown.

The faces of the cleats 3 opposite to the faces on which the slats are secured are cut away somewhat in vertical alinement with the central space between the slats, as at 5, for a purpose as will appear.

The vertical faces of the cleats 3 which face each other are slotted or recessed to a certain depth centrally of the length of the cleats, as at 6.

Driven into the end cleats 2 of the box are pins 7, positioned to enter the slots adjacent the inner ends thereof when the lid is properly located on the box, and thus preventing longitudinal or transverse displacement of the lid.

Said pins at their upper ends are bent to form horizontal arms or extensions 8 initially facing each other, a form of head 9 being provided at the junction of each pin with its extension, projecting above the latter, and against which the blow of a hammer may be directed.

The heads and extensions are passable through the slots, as well as the pins themselves.

In operation, with the pins in the above named initial positions, the lid, when the box is filled with fruit in the field, is placed on the box with the cleats 3 down, the pins 7 guiding the lid into its proper position and the heads 9 being then somewhat below the upper edges of slats 4, as shown in Fig. 3, so as not to interfere with the stacking of the boxes on each other.

It will then be evident that while the lid cannot be moved horizontally, there is nothing to interfere with instant removal when necessary.

After inspection and when the fruit has settled, the lid is replaced in a reversed position or with the slats 4 down and resting on the box-cleats, thus bringing said slats closer to the top of the box than was previously the case. The cleat recesses 5 are of such a depth that the pin-extensions 8 will then project in said recesses clear of the slots 6, so that the extensions and pins may be given a quarter turn to place the former at right angles to the slots and over the solid wood of the cleats. A blow of a hammer on the heads 9 will then cause the pins to be driven deeper into the box and the extensions 8 will sink into the cleats 3, which as is customary, are of soft wood.

The lid is then firmly held in place against undesired removal from the box.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A reversible lid for fruit boxes including slats, cleats on the free ends of the slats arranged to aline with the ends of the box whereby before the fruit has settled in the box the cleats may be rested on the top edges of the ends to hold the slats from pressing against the fruit and after the fruit has settled the lid may be reversed so that the slats will then rest on the top edges of the ends of the box to hold the fruit flush with the top edge of the box, and means for fastening the lid in either position.

2. A structure as in claim 1, in which said fastening means in either event is below the upper surface of the lid so that the boxes may be readily piled one upon the other.

3. A reversible lid for fruit boxes including slats, and cleats on the free ends of the slats arranged to aline with the ends of the box whereby before the fruit has settled in the box the cleats may be rested on the top edges of the ends to hold the slats from pressing against the fruit and after the fruit has settled the lid may be reversed so that the slats will then rest on the top edges of the ends of the box to hold the fruit flush with the top edge of the box, and a nail initially secured in each end of the box, and being of a height equal to the thickness of the cleats and having an extension turnable into engagement with the cleats to hold the lid in its first position.

4. A reversible lid for fruit boxes including slats, and cleats on the free ends of the slats arranged to aline with the ends of the box whereby before the fruit has settled in the box the cleats may be rested on the top edges of the ends to hold the slats from pressing against the fruit and after the fruit has settled the lid may be reversed so that the slats will then rest on the top edges of the ends of the box to hold the fruit flush with the top edge of the box, and a nail initially secured in each end of the box, and being of a height equal to the thickness of the cleats and having an extension turnable into engagement with the cleats to hold the lid in its first position, the opposite sides of the cleats being recessed so that when the lid is reversed the nails may be turned with their extensions over the cleats and then driven against the cleats within said recesses.

5. A reversible lid for fruit boxes including slats, and cleats on the free ends of the slats arranged to aline with the ends of the box whereby before the fruit has settled in the box the cleats may be rested on the top edges of the ends to hold the slats from pressing against the fruit and after the fruit has settled the lid may be reversed so that the slats will then rest on the top edges of the ends of the box to hold the fruit flush with the top edges of the box, and a nail initially secured in each end of the box, and being of a height equal to the thickness of the cleats and having an extension turnable into engagement with the cleats to hold the lid in its first position, the opposite sides of the cleats being recessed so that when the lid is reversed the nails may be turned with their extension over the cleats and then driven against the cleats within said recesses, each nail having an upturned head adjacent its extension to receive the hammer impact for driving the nail to position.

In testimony whereof I affix my signature.

JAMES H. SHAW.